W. O. SNELLING.
PHOTOCHEMICAL PROCESS.
APPLICATION FILED FEB. 6, 1917.
1,325,214.
Patented Dec. 16, 1919.
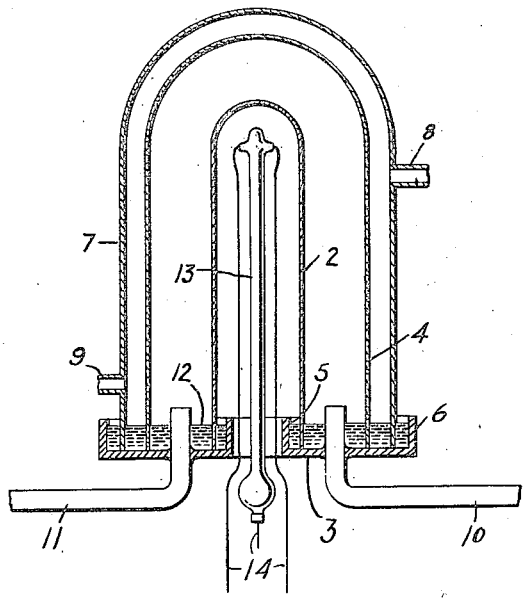
WITNESSES:
Fred H Miller
J. R. Langley
INVENTOR
Walter O. Snelling
BY
Robson De V Brown
ATTORNEY

UNITED STATES PATENT OFFICE.

WALTER O. SNELLING, OF ALLENTOWN, PENNSYLVANIA.

PHOTOCHEMICAL PROCESS.

1,325,214.     Specification of Letters Patent.     Patented Dec. 16, 1919.

Application filed February 6, 1917. Serial No. 146,975.

*To all whom it may concern:*

Be it known that I, WALTER O. SNELLING, a citizen of the United States, and a resident of Allentown, in the county of Lehigh and State of Pennsylvania, have invented a new and useful Improvement in Photochemical Processes, of which the following is a specification.

My invention relates to the preparation and treatment of halogen derivatives of carbon compounds, and has for one of its objects to provide a process of photochemically reducing highly halogenated compounds to compounds of decreased halogen content by means of substances that are capable of combining with the halogens present under the influence of actinic rays.

In the production of chlorinated hydrocarbons and other halogenated compounds, it is usual to begin with compounds containing but little halogen, or none at all, and to cause such compounds to take up the desired number of halogen atoms. In some cases, however, the reverse procedure is useful, as in certain processes of chlorinating methane which yield both chloroform and carbon tetrachlorid, and in which it is desirable to transform a part or all of the carbon tetrachlorid into chloroform on account of the higher market price of the latter substance. Other cases requiring reduction of chlorin compounds arise in the preparation of chlorinated bodies which do not tend to form in the ordinary course of chlorinating reactions because of the excess of chlorin present. It has heretofore been the practice to bring about chlorin-removing reactions by means of nascent hydrogen.

I have discovered that the reduction of chlorinated hydrocarbons and other halogenated compounds may be quickly and easily brought about by mixing the halogenated body, in the form of vapor, with a substance capable of combining with the halogen, and exposing the mixture to actinic rays. This process may be carried out in any suitable apparatus, one convenient form of cell for this purpose being shown in central vertical section in the single figure of the accompanying drawing. This apparatus is similar in its general construction and mode of operation to the structure described and claimed in my copending application for Letters Patent, Serial No. 132,869, filed November 22, 1916.

In the drawing, a dome 2, of glass, quartz or other material that is pervious to the actinic rays employed, is shown inverted upon a shallow annular pan or tray 3, of lead or other suitable material, which also supports a larger dome 4 and which is provided with up-turned inner and outer flanges 5 and 6. The larger dome 4 need not be composed of transparent material, and may suitably be made of sheet lead or other metal. An outer dome or jacket 7 also rests upon the tray 3 and is provided with inlet and outlet connections 8 and 9 for the introduction of steam, water or other heating or cooling fluid Inlet and outlet pipes 10 and 11 for reaction materials and products extend into the space between the domes 2 and 4 through the bottom of the pan 3 and through a liquid seal 12 which may consist either wholly or in part of a product of the reaction taking place in the cell. A source of actinic rays, indicated as a mercury vapor lamp 13, is disposed within the dome 2 and is supplied with electric energy through conductors 14.

In the operation of the cell which I have herein shown and described, a mixture of reagents, such as carbon tetrachlorid vapor and a reducing agent such as hydrogen, methane or the like, is introduced into the apparatus through one of the pipes 10—11, and is subjected to the action of actinic rays from the lamp 13. The reaction which results may be assisted by passing a heating or cooling fluid through the space between the domes 4 and 7, and thereby maintaining the temperature which is most favorable to the reaction that is taking place. The reducing action proceeds fast enough to enable the reaction materials to be passed through the cell continuously and at an economical rate.

As a rule, I prefer to maintain an elevated temperature in the cell by passing steam through the outer jacket, though some dehalogenizing reactions require lower temperatures. The amount of reducing agent to be employed varies considerably, in accordance with the specific halogenated compound under treatment. In some cases, I find it advantageous to use a large excess of reducing material instead of only the theoretical quantity, such excess amounting to ten or twenty times the amount actually required to replace the halogens, since I find that a very great excess of halogen-combining material assists in the reaction. This excess is of course used over and over again, only the amount actually taking part in the reaction being removed in each treatment.

In addition to hydrogen and methane, which are mentioned above as examples of reducing agents, many other substances are suitable for my present purpose. Among such reagents are the saturated paraffin hydrocarbons of the methane series, such as ethane, propane and butane, as well as unsaturated hydrocarbons of the olefin and acetylene series. Hydrocarbons are well adapted for my use, since they react with the halogen of the substance under treatment to form new halogen substitution compounds which are either valuable in themselves or are useful in preparing other compounds by synthetic methods.

Carbon monoxid is another suitable reducing agent for use in carrying out my process, and carbonyl chlorid, phosgene, is produced as a by-product when carbon tetrachlorid is thus treated with carbon monoxid for the production of chloroform or lower chlorin compounds of methane. In general, any substance which tends to combine with chlorin or other halogens under the influence of actinic rays is suitable for use as the halogen-removing agent in my process.

My process is adapted to the treatment of halogenated carbon compounds in general, with only such modifications with respect to temperature and time as are required by the special characteristics of various materials. In order to properly treat certain substances, I find it necessary to work slowly and at low temperatures, as in bringing about the rearrangement of some of the higher-boiling chlorin compounds of butane and pentane, which decompose badly if heated above a moderate temperature. Relatively low temperatures may also be employed when the reducing agent has a high affinity for the halogen, as in the treatment of chlorin compounds with hydrogen or acetylene, or when a very powerful source of actinic rays is employed.

The halogenated compounds which are best adapted for treatment according to my process are those which vaporize at comparatively low temperatures and without decomposition. My process is not limited to the treatment of such compounds, however, and in the preparation of certain compounds I find it desirable to utilize the higher-boiling halogenated compounds, and even those which undergo deep-seated decomposition at the temperatures employed.

It will be evident from the foregoing description that my invention is capable of a very wide variety of modifications, with respect to the materials treated and the reagents, process steps and apparatus employed. I desire to claim broadly as my invention the photochemical removal of halogens from their compounds and it is to be understood, therefore, that no limitations are to be imposed upon my invention except such as are indicated in the appended claims.

I claim as my invention:

1. A process that comprises exposing a halogenated carbon compound to actinic rays in the presence of a substance capable of reacting with the carbon compound to remove halogen therefrom.

2. A process that comprises mixing a halogenated carbon compound with a substance capable of reacting with the carbon compound to remove halogen therefrom, and exposing the resulting mixture to actinic rays.

3. A process that comprises mixing a chlorinated carbon compound with a substance capable of reacting to remove chlorin from the said compound, and exposing the resulting mixture to actinic rays.

4. A process that comprises mixing carbon tetrachlorid with a substance capable of reacting with carbon tetrachlorid to remove chlorin therefrom, and exposing the resulting mixture to actinic rays.

5. A process that comprises exposing a halogenated carbon compound to actinic rays in the presence of an excess of a substance capable of reacting with the said compound to remove halogen therefrom.

6. A process that comprises exposing vapor of a halogenated carbon compound to actinic rays in the presence of a hydrogen-containing gas or vapor.

7. A process that comprises exposing vapor of a halogenated carbon compound to actinic rays in the presence of hydrocarbon gas or vapor.

In testimony whereof I have hereunto subscribed my name this 3rd day of February, 1917.

WALTER O. SNELLING.